United States Patent [19]
Liepold et al.

[11] Patent Number: 5,257,749
[45] Date of Patent: Nov. 2, 1993

[54] HUB FOR INFORMATION MEDIA

[75] Inventors: August Liepold; Bernd Scholtysik; Hartmut Thiele; Jose Toral, all of Munich, Fed. Rep. of Germany

[73] Assignee: BASF Magnetics GmbH, Mannheim, Fed. Rep. of Germany

[21] Appl. No.: 835,833

[22] Filed: Feb. 18, 1992

[30] Foreign Application Priority Data

Feb. 22, 1991 [DE] Fed. Rep. of Germany ....... 4105604

[51] Int. Cl.$^5$ ............................................. B65H 75/18
[52] U.S. Cl. ..................................... 242/68.5; 206/509
[58] Field of Search .................... 242/68.5, 68.6, 71.8; 206/118.2, 394, 509

[56]  References Cited

U.S. PATENT DOCUMENTS

| | | | |
|---|---|---|---|
| 3,066,794 | 12/1962 | Mulheren et al. | 242/68.5 |
| 3,632,053 | 1/1972 | Edwards | 242/71.8 |
| 4,052,020 | 10/1977 | Knox . | |
| 4,081,151 | 3/1978 | Ender et al. | 242/68.5 |
| 4,280,670 | 7/1981 | Schor . | |
| 4,385,734 | 5/1983 | Shiba . | |
| 4,923,137 | 5/1990 | Jorgensen et al. | 242/68.5 |

FOREIGN PATENT DOCUMENTS 2233615 1/1975 France .

Primary Examiner—Daniel M. Yasich
Attorney, Agent, or Firm—Keil & Weinkauf

[57] ABSTRACT

Abstract of the Disclosure: A flangeless stackable hub, on which compressing of the inner central bore is to be prevented during the winding up of an information medium in tape form under high winding pressure. According to one embodiment, this is achieved by an outer hub ring having a double-T profile being provided alongside the outer winding area and by there also being elastically deformable annular intermediate elements between outer hub ring and inner hub ring. In the case of another embodiment, variously shaped openings or notches, which are distributed evenly over the entire circumference, are provided on both sides of the hub between outer circumference and inner circumference. In addition, the hub contains alongside its inner circumference on both sides axial deformations, in order to avoid a shifting or twisting when hubs are stacked one on top of the other (FIG. 2, FIG. 4).

1 Claim, 4 Drawing Sheets

FIG.1
FIG.2
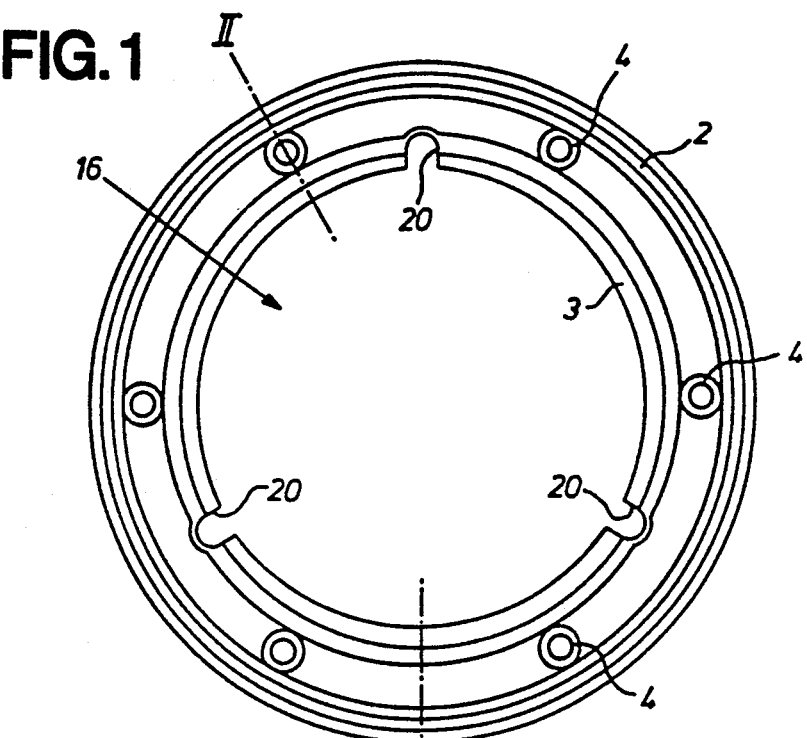
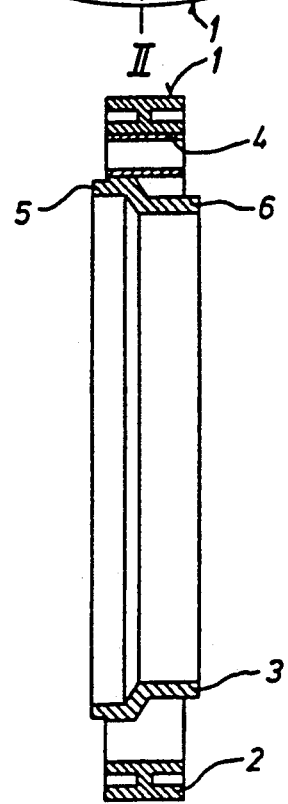

5,257,749

HUB FOR INFORMATION MEDIA

FIELD OF THE INVENTION

The invention relates to a flangeless stackable hub for wound-up information media in tape form, the width of the winding area of the hub being equal to or slightly greater than the width of the information medium to be wound up and the hub containing a central bore and comprising a plurality of concentric zones (2, 3), which are connected to one another by elastically deformable intermediate elements running in radial and circumferential directions.

BACKGROUND OF THE INVENTION

Once the magnetic coating has been produced on a flexible base in tape form, information media, for example magnetic tapes, are cut to the width required for use and are wound onto flanged reels or flangeless hubs in a length of up to several thousand meters. For this purpose, the hub is fitted with its central bore onto the drive spindle of a winding machine and the information medium is wound up at high speed and under an appropriately adapted winding pressure. In general, to save on cost and weight, the hubs have between the outer winding area and the inner circumference areas of restricted cross section, radially running reinforcing ribs being provided to increase the stability in this zone where the material is thinner. An example of such a hub is mentioned in DE-U 77 22 919. A stackable hub, on which the tape rolls, stacked one on top of the other, are secured against twisting and consequently against damage, is known from. DE 24 48 853.

During winding of the information media onto said hubs as well as during rewinding, such high tensions in the tape may occur that the winding pressure causes the hub bore to be constricted, as a result of which the hubs can no longer be fitted onto the drive spindle of the winding apparatus or cannot be pulled off it. To counter this problem, it is known to produce the hubs from glass fiber reinforced plastic and, if appropriate, to dispense with the thinning of the material mentioned; in addition, hubs of metal are in use. However, for reasons of weight and cost, these solutions have considerable disadvantages.

To avoid the constriction of the hub bore, the already mentioned Utility Model 77 22 919 discloses a radially running threading slit, which is constricted during winding and thereby takes up the winding stress. U.S. Pat. No. 3,632,053 discloses a flanged reel, the hub of which has the generic properties mentioned at the beginning and on which, in addition, flexible intermediate elements are respectively provided between hub and flange in order to avoid transmitting the compression to the flanges. However, as the description reveals, this known hub also requires glass fiber reinforced polystyrene or metal as the material for the hub. It can also be read in the description of EP 0 375 322 of the same applicant that, in spite of the flexible intermediate elements, the inside diameter of the hub is still compressed. In the latter document, to avoid this compression it is proposed to provide between outer and inner ring a number of obliquely running ribs, which have the consequence of twisting the outer ring against the inner ring. U.S. Pat. No. 4,052,020 discloses a reel for a computer tape, on which the outer winding area of the hub is covered with a flexible surface, in order in this way to absorb the stress occurring during winding.

Setting out from the prior art mentioned above, it is an object of the present invention to provide a hub of the generic type mentioned at the beginning which does not have the disadvantages of the prior art, which is furthermore made of plastic and is to do without reinforcing additives, for example glass fibers or glass beads, because this presents recycling problems. Moreover, it is an object of the present invention that dishing of the tape roll does not occur when a number of hubs bearing rolls of tape, known as pancakes, are stacked one on top of the other, and that such a stack of pancakes does not present any problems during transport and storage.

SUMMARY OF THE INVENTION

We have found that this object is achieved with a flangeless stackable hub for wound-up information media in tape form, the width of the winding area of the hub being equal to or slightly greater than the width of the information medium to be wound up, the hub having a central bore as well as driving grooves on its inner circumference and comprising a plurality of concentric zones, which are connected to one another by elastically deformable intermediate elements running in radial and circumferential directions, wherein the outer ring has a double-T profile and wherein the flexible intermediate elements are arranged evenly in the circumferential direction and have an annular structure.

Another embodiment of the invention is a flangeless stackable hub for wound-up information media in tape form., the width of the winding area of the hub being equal to or slightly greater than the width of the information medium to be wound up, the hub having a central bore as well as driving grooves on its inner circumference and comprising a plurality of concentric zones, which are connected to one another by elastically deformable intermediate elements running in radial and circumferential directions, wherein the hub has openings evenly distributed over the circumference on both sides between the outer circumference and the inner bore.

A further embodiment of the invention is a flangeless stackable hub for wound-up information media in tape form, the width of the winding area of the hub being equal to or slightly greater than the width of the information medium to be wound up, the hub having a central bore as well as driving grooves on its inner circumference and comprising a plurality of concentric zones, which are connected to one another by elastically deformable intermediate elements running in radial and circumferential directions, wherein a plurality of concentric annular notches are provided between outer circumference and inner circumference, the notches being offset with respect to one another in the radial direction in a meandering form.

Further details of the invention and expedient embodiments are contained in the subclaims, the drawings and the description.

SHORT DESCRIPTION OF THE INVENTION

The invention will now be explained in further detail with reference to the drawings, in which:

FIG. 1 shows a plan view of a preferred embodiment of the hub according to the invention FIG. 2 shows a cross section through a hub according to FIG. 1 along the line II/II FIGS. 3-8 show plan views of further preferred designs of the hub according to the invention with flexible elements.

PREFERRED EMBODIMENTS OF THE INVENTION

The essential feature of the embodiment according to FIGS. 1 and 2 is that the outer ring (2) of the hub comprising two concentric rings has a double-T structure, which can be seen in cross section, and that annular flexible intermediate elements (4) are arranged evenly distributed in the circumferential correction between the outer ring (2) and the inner ring (3). By the combination of double-T groove and flexible intermediate elements, a transmission of the compression from the outer ring to the inner ring is avoided in a particularly effective way and, at the same time, a significant weight saving is accomplished, without having to reinforce the plastic material with glass fiber or similar additives. The inner ring (3) preferably has axial projections, known per se, on both its sides (5, 6), which projections are mutually offset in the radial direction, so that the hubs are protected against shifting when they are stacked. In addition, the central bore (16) of the hub likewise has driving grooves (20), similarly known from the prior art.

Instead of the annular axial projections (5, 6) mentioned above, the inner ring may also be provided with a plurality of deformations (17, 18), which extend alternately to both sides in the circumferential direction on the inner circumference of the hub and respectively interlock when a number of hubs are stacked one on top of the other, and in this way prevent them twisting with respect to one another. Such hubs are known from the already mentioned DE 24 48 853. As a result, the width of the inner ring (3) on said preferred embodiments is greater than the width of the winding area (1). FIG. 3 represents another embodiment, in which, instead of the annular intermediate elements (4), S-shaped webs (7), extending in radial and circumferential directions, are arranged evenly distributed.

Further, likewise preferred embodiments of the present invention can be seen from FIGS. 4, 6, 7 and 8. These embodiments have in common that the hub does not comprise two concentric rings, but that openings, evenly distributed over the circumference on both sides, are provided between the outer circumference or the winding area (1) and the inner bore (16), which openings both mean a material saving and have the consequence of the required compression of the outer circumference on account of the winding pressure, without the compression being transferred inwardly in such a manner as to prevent construction of the hub bore. The following shapes have proved successful here:

According to FIG. 4, the circular openings (8, 9) are arranged in one or more concentric circles, it being possible for the openings to be of different sizes and to be arranged offset with respect to one another.

FIGS. 5/5a have as compression elements annular notches (11) which, as FIG. 5a shows in cross section, are on both sides offset with respect to one another in the radial direction in a meandering form.

According to FIG. 6, the openings are punched out in an H shape (12), the structure circumferentially at an acute angle with respect to the radius being preferred.

In the case of these abovementioned embodiments as well, axial projections or deformations (5, 6, 17, 18) are provided in the vicinity of the inner circumference or of the hub bore, as already described in further detail above, in order in this way to avoid a displacing or twisting of the hubs stacked one on top of the other.

EXAMPLE 1

On a hub having an outside diameter Da of 114 mm, a bore inside diameter Di of 77 mm and having a width of 15 mm, consisting of polyvinyl chloride without further additives and, as represented in FIG. 1, provided with 6 circular flexible intermediate elements and double-T groove, a half-inch video magnetic tape of a total thickness of 15.6 $\mu$m and a length of 5000 m was wound up on a conventional winding apparatus and at a speed of 450 m/min. During this operation, the winding parameters, that is tape tension and pressure of the contact roller pressing the magnetic tape onto the hub, were chosen in such a way that a winding pressure of 20 bar acted on the hub.

EXAMPLE 2

Figure 3:
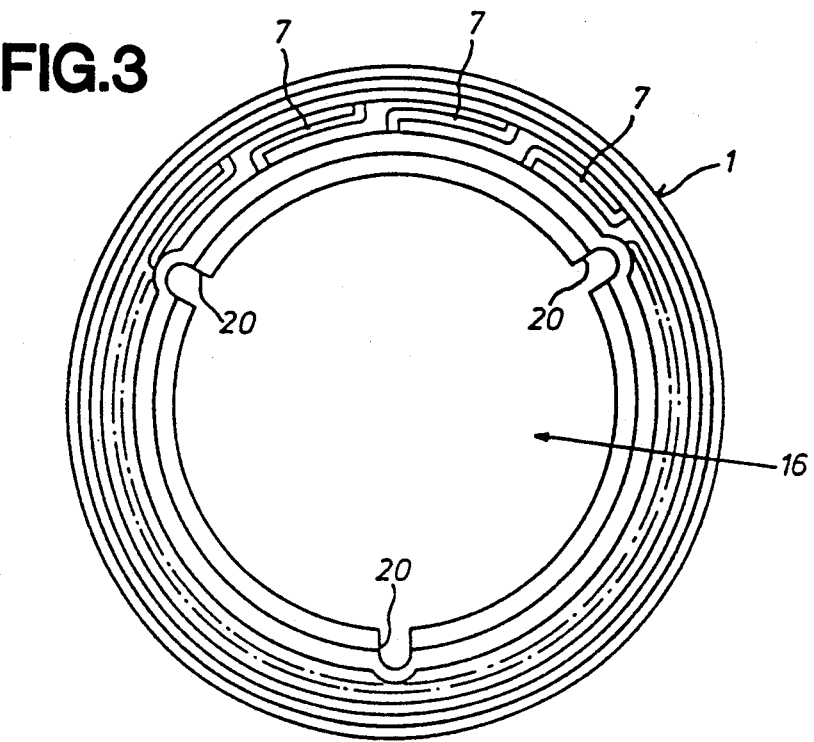
Figure 4:
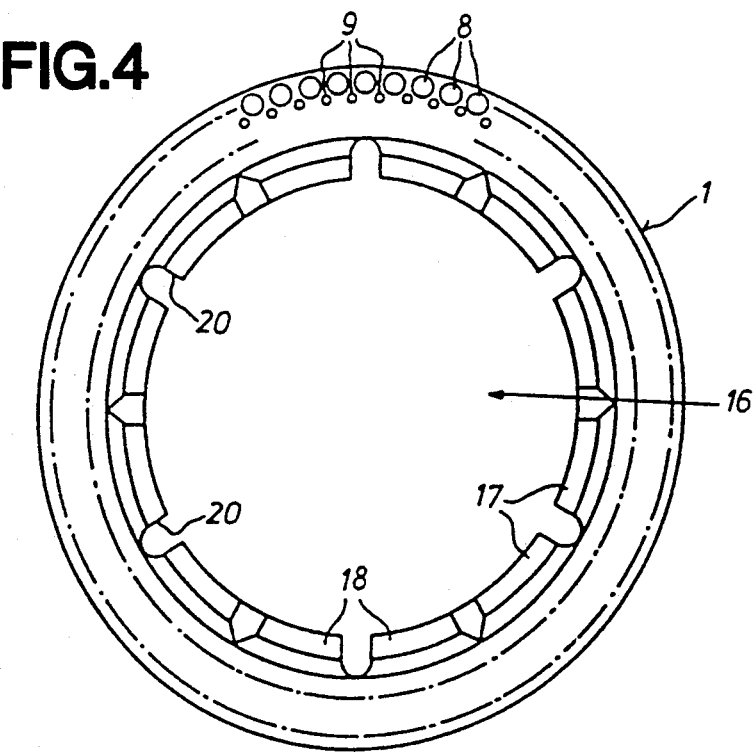
Figure 5:
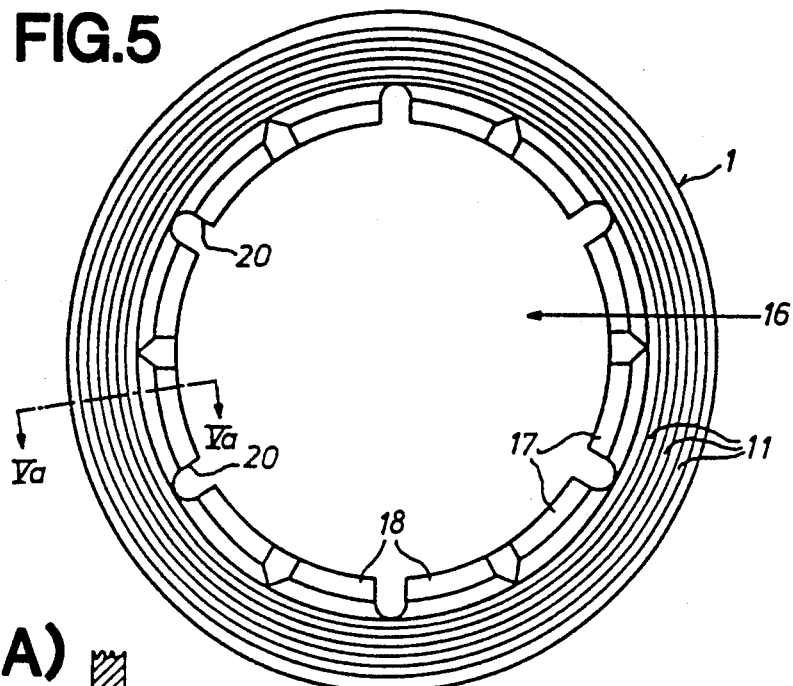
Figure 5A:
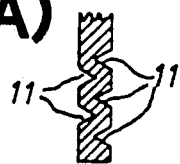
Figure 6:
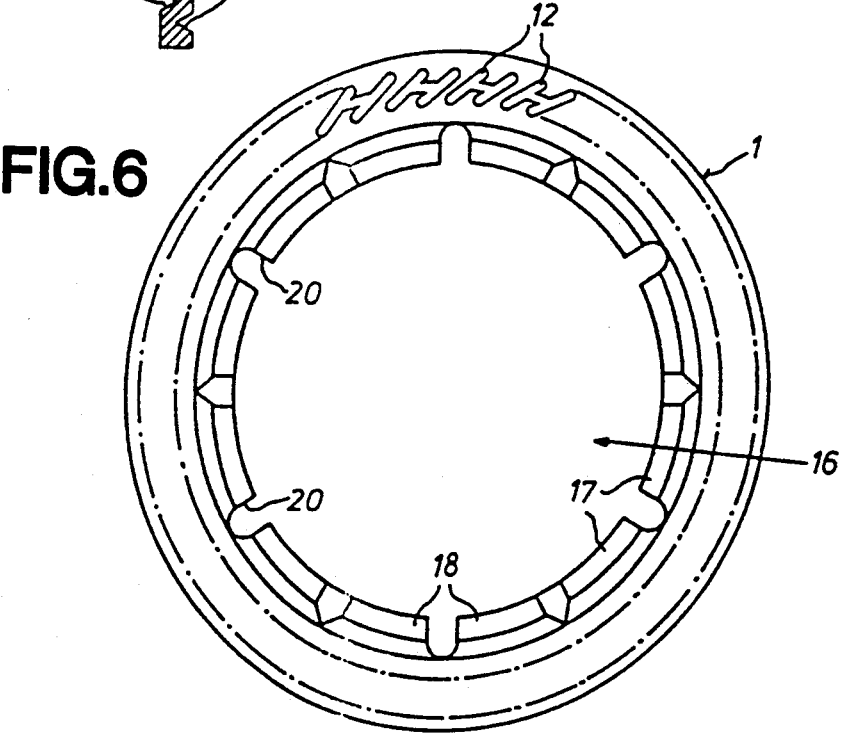
Figure 7:
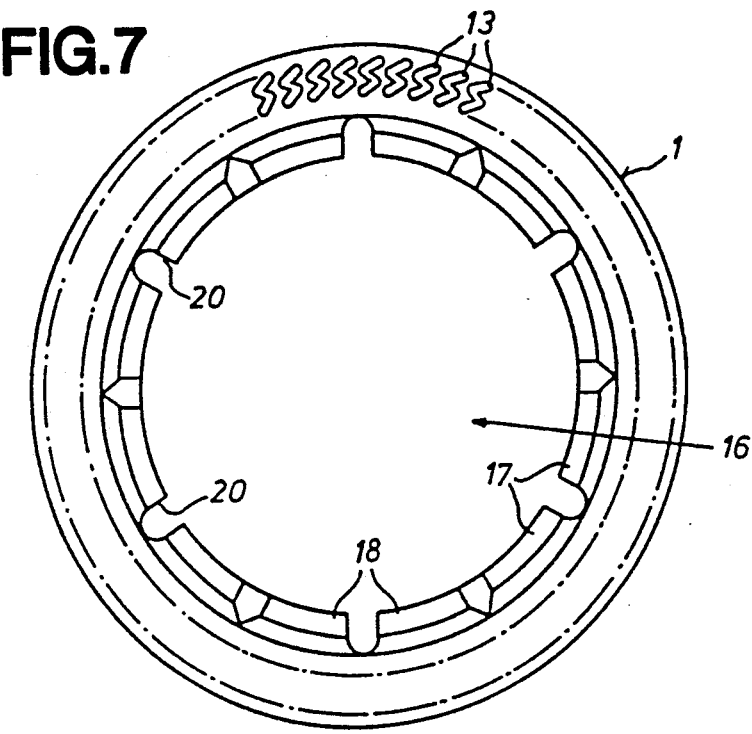
FIG. 7 shows openings in zig-zag form (13).
Figure 8:
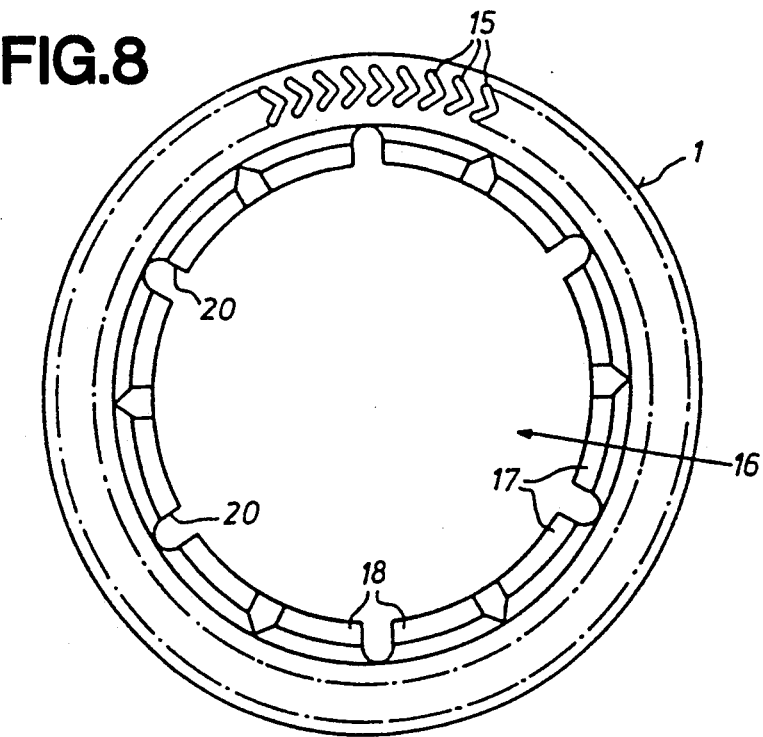
FIG. 8 represents chevron-like openings (15) in the circumferential direction.

On a hub having an outside diameter Da of 114 mm, a bore inside diameter Di of 77 mm and having a width of 15 mm, consisting of polyamide without further additives and, as represented in FIG. 3, provided with 12 S-shaped flexible intermediate elements and double-T groove, a half-inch video magnetic tape of a total thickness of 19 $\mu$m and a length of 5000 m was wound up, as described in Example 1.

COMPARATIVE EXAMPLE

A commercially available hub, known as a NAB hub, consisting of glass fiber reinforced polystyrene and having the same dimensions as in Example 1 but a cross-sectional constriction between outside diameter and inner bore and 9 radial webs on both sides, was wound with the same tape under precisely the same conditions as in Example 1.

The following table shows the reduction in the hub diameters $\Delta$ Da, $\Delta$ Di on the wound hub of the examples according to the invention in comparison with a hub according to the prior art.

TABLE

| Hub according to Modulus of elasticity $Nmm^{-2}$ | Example 1 | Example 2 | Comparative example |
|---|---|---|---|
|  | 3800 | 3000 | 5500 |
| $\Delta$ Da | 0.5 mm | 0.3 mm | 0.5 mm |
| $\Delta$ Di | 0.1 mm | 0.06 mm | 0.4 mm |

We claim:

1. A flangeless stackable hub for wound-up information media in tape form, the width of the outer winding area (1) of the hub being equal to or slightly greater than that the width of the information medium to be wound up, the hub having a central bore (16) and driving grooves (20) on its inner circumference and comprising a plurality of concentric zones including an outer ring (2) and an inner ring (3), which are connected to each other by flexibly deformable intermediate elements the outer ring (2) having a double-T profile, wherein the flexible intermediate elements are S-shaped webs (7) running in radial and circumferential directions.

* * * * *